United States Patent [19]

Nathanson et al.

[11] 3,896,338

[45] July 22, 1975

[54] COLOR VIDEO DISPLAY SYSTEM COMPRISING ELECTROSTATICALLY DEFLECTABLE LIGHT VALVES

[75] Inventors: Harvey C. Nathanson; Jens Guldberg, both of Pittsburgh, Pa.

[73] Assignee: Westinghouse Electric Corporation, Pittsburgh, Pa.

[22] Filed: Nov. 1, 1973

[21] Appl. No.: 411,885

[52] U.S. Cl. .......... 315/373; 178/7.5 D; 178/5.4 BD

[51] Int. Cl. .......... H01j 29/70

[58] Field of Search .......... 315/21 R, 373; 313/91; 178/7.5 D, 5.4 BD

[56] References Cited

UNITED STATES PATENTS 3,667,830 6/1972 Rottmiller .......... 313/91

3,746,911 7/1973 Nathanson et al. .......... 315/21 R

*Primary Examiner*—Maynard R. Wilbur

*Assistant Examiner*—J. M. Potenza

*Attorney, Agent, or Firm*—W. G. Sutcliff

[57] ABSTRACT

A color video imaging system utilizing a cathode ray device with a target comprising an array of electrostatically deflectable light valves. The light valve structure and the arrangement of light valves as an array permits sequential activation of the light valves in response to a specific primary color video signal. The light valves are arranged in three element groupings, and a schlieren optical means is provided having respective primary color transmissive portions through which the light reflected from the deflected light valves is passed, to permit projection of a color image upon a display screen.

11 Claims, 7 Drawing Figures

COLOR VIDEO DISPLAY SYSTEM COMPRISING ELECTROSTATICALLY DEFLECTABLE LIGHT VALVES

BACKGROUND OF THE INVENTION

1. Field of the Invention

This invention relates to a color video display system utilizing electrostatically deflectable light valves which are used to reflect and modulate a light beam to produce a color image upon a display screen.

2. Description of the Prior Art

The entertainment industry is seeking a color television imaging system which will permit projection of a color image upon a large display screen. Early attempts to provide such a system utilized field sequential techniques to generate the color displays. A rotating color wheel was disposed in front of the camera and synchronized with another color wheel and projector to generate the primary color images which were mixed on the screen. This technique imposed severe restraints upon the flexibility of the system. A commercial system, with Eidophor projection display, employs a cathode ray device which has an oil film target, the light refractive characteristics of which are modified in correspondence to a video signal to permit projection of a color display. This system is expensive and bulky, and because of the incorporation of the oil film within a cathode ray device does not offer a long lifetime of usage.

A more recently developed tight valve utilizes an array of electrostatically deflectable light valves as the target in a cathode ray tube for projecting video images. Such a device is disclosed in U.S. Pat. No. 3,746,911. In this system the electron beam of a cathode ray tube is utilized as the means by which the electrostatic charge and deformation of the individual light valves is modulated according to the video signal. The projected image for such a system was a black and white image and it is desirable to extend its capabilities to a color display.

SUMMARY OF THE INVENTION

A color video imaging system is disclosed utilizing a cathode ray tube having a target structure which comprises an array of electrostatically deflectable elements or light valves in groups of three, in correspondence with the three primary colors red, blue and green. The light valves are electrostatically charged in response to specific video color signals.

The light valves preferably are arranged in a grouping of three elements about a central axis. Each of the three elements comprises a generally planar deflectable reflective portion which has a support and spacer post extending from the underside of the planar portion to the supporting light transmissive substrate. The support and spacer posts are spaced about 120 degrees apart about the central axis. A conductive grid is disposed upon the substrate proximate the perimeter of the planar portions. The electrostatic force is between the planar portions and the conductive grid.

An external light source and optical means are utilized for directing light onto the array of light valves. An optical projection system permits imaging of a colored image on the display screen, and includes transmissive portions corresponding to the primary colors for passing light from deflected light valves.

Synchronizing and modulating means may be provided to properly apply the video signal to the device and permit sequential activation of the respective primary color designated reflective light valves.

DESCRIPTION OF THE PREFERRED EMBODIMENT

Figure 1:
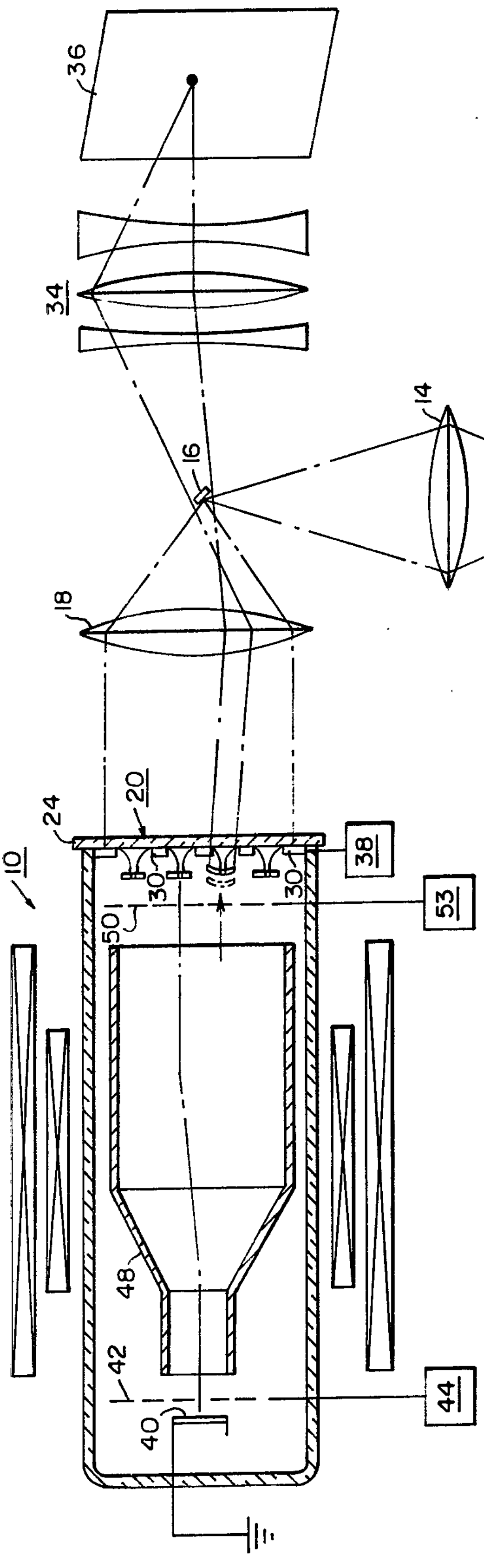
FIG. 1 is a schematic representation of a color video imaging system according to the present invention.

FIG. 1 illustrates an exemplary embodiment of the color video imaging system of the present invention. The system comprises a cathode ray tube 10. A high intensity light source 12 provides illumination which is directed by focusing lens 14, schlieren optical means 16, and collimating lens 18 upon the target 20 of the tube 10. The target 20 comprises an array of reflective elements or light valves 22, disposed on the interior surface of a substrate 24 which forms the face plate of tube 10. The electrostatically deflectable array of individual light valves 22 of target 20 is shown in schematic form in FIG. 1 in a greatly enlarged fashion to facilitate an understanding of the present system.

Figure 2:
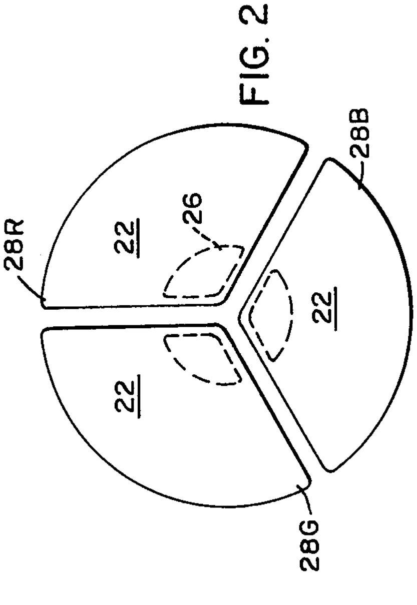
FIG. 2 is an enlarged plan view of a single triad grouping of light valves.

A view of a single three element grouping of reflective light valves 22, as seen in the direction of electron beam path is seen in FIG. 2. The substrate 24 is a light transmissive material such as quartz, sapphire, or spinel. In this embodiment, the three distinct light valves 22 are symmetrically disposed about a central axis. The light valves 22 are identical, but each one of the three grouped together serves as a light valve or mirror for light of a primary color, i.e., green, red, or blue. A spacer post 26 of a material such as epitaxially grown silicon extends from the surface of the substrate member 24, and supports a generally planar, approximately triangular reflective wing which is designated 28G, 28R, 28B for the respective light valves associated with the respective primary colors. The generally triangular planar elements preferably extend through an arc of about 120 degrees.

Figure 3:
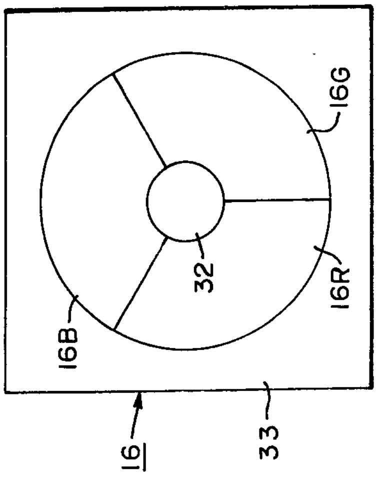
FIG. 3 is an enlarged view of the schlieren optical means utilized in the embodiment using the light valve shown in FIG. 2.

The respective wing portions 28R, 28B, 28G are separated by slits 23, with the support posts 26 being spaced apart by slightly more than the width of the slits. The spacer post 26 is of substantially less cross-section than the reflective wing 28, with the generally planar wing portion 28 typically being silicon dioxide. A thin film light reflective coating such as aluminum is provided upon the top surface of wing portion 28. A plurality of light valves 22 is provided in an array, of for example, rows and columns of identical light valves 22 with a conductive grid 30 provided on the surface of substrate 24 between the spaced apart light valves 22. The conductive grid 30 may be laid down at the same time as the light reflective coating is vapor deposited onto wing portion 28. Each of the respective reflective main portions 28R, 28B and 28G correspond to the electrostatically deflectable mirror for a specific primary color. The primary direction of deflection or deformation of each reflective wing 28 will be along axes which are symmetrically spaced from each other by approximately 120°. The schlieren optical means 16 seen enlarged in FIG. 3 comprises a reflective central stop 32, and three approximately triangular, selectively transmissive windows 16R, 16B and 16G surrounding the central stop 32. White light which is reflected from deformed reflective wing 28R, corresponding to a red light signal will be deflected and transmitted through schlieren window 16R, which is transmissive to red light. When the reflective wing 28R is not deformed, i.e., when no chromanance signal is being applied, the light reflected from wing 28R will impinge on the schlieren stop and not be transmitted to the display screen. An opaque support member 33 is provided about the windows 16R, 16B and 16G.

With 28R chosen to modulate the primary color red, similar conditions will hold for 28B and 28G, which may be chosen to modulate the primary colors blue and green respectively. In this way, substantially equal deflection of the light valves produces while light incident on the face plate 20. The reflected light is colored only by the transmission filters 16R, 16B and 16G. In this way light corresponding to the three primary colors will be passed by the schlieren optical means 15 and directed through projection lens system 34 onto the display screen 36 where the color video image is displayed.

The color projection is preferably achieved in a dot sequential fashion for the array of triad grouped light valves. The video modulation of luminance and chromanance signals is sequentially achieved by varying the potential of the grid 30 which is disposed on substrate 24 proximate the perimeter of the planar portion 28. The potential of grid 30 is modulated from video signal source means 38. An electron gun means 40 is disposed at the other end of cathode ray tube 10, and provides a beam source of electrons.

In an alternative embodiment, a control grid 42 may be disposed proximate the cathode for modulating the electron beam. When such a control grid 42 is utilized it is connectable to the signal source 44 which provides the necessary signals during write and erase. The electrode 48 and grid electrode 50 accelerate and focus the electron beam from the cathode gun 40. A grid electrode 50 is disposed adjacent to the target 20. In the preferred embodiment where the video modulation is achieved by varying the potential of the barrier grid 30, the beam electrons land at high velocity and charge each reflective mirror segment of light valve 22 to equilibrium with the barrier potential. The potential difference between the grid electrodes 50 and 30 will then appear as the electrostatic bias between the light valve 22 and the electrode 30 disposed on the substrate underneath. During erasure the potential on the electrodes 30 and 50 is the same. Through accurate time sequencing of the potential signal upon the barrier grid 30, one wing 28R of the light valve 22 will be deflected, and information corresponding to the primary color red will be reflected from the deflected wing 28R past the schlieren stop 16 via transmissive portion 16R and the lens system to the display screen. The other two wings of the light valve 22 will be sequentially deformed and actuated by the appropriate potential signal for the grid electrode 30 and in this way the video image will be generated in a dot sequential fashion.

While the preferred embodiment has been described with reference to video modulation of the barrier grid, the light valves may also be operated in a similar manner when the beam current is modulated by the grid 42. In this case the biases on grid 30 and 50 are preferably held constant, and the charge deposited by the beam will raise the potential of the light valve 22, however it will not write completely to equilibrium with the given electrode 50.

Figure 4:
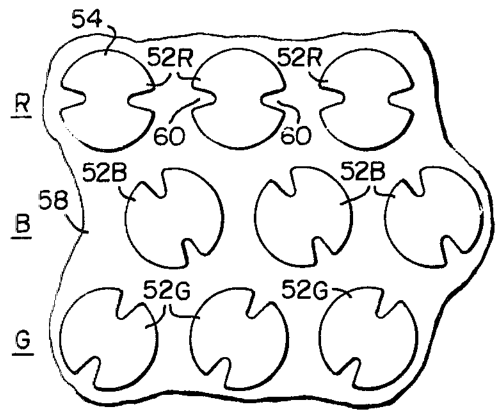
FIG. 4 is an enlarged representation for an array of light valves in another embodiment of the invention.
Figure 6:
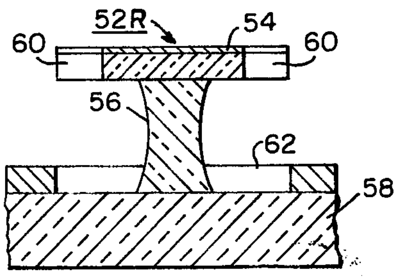

In another embodiment, rows of light valves or mirror elements are constructed with each element in the row structured to bend or be deflected in only one direction. In FIG. 4, a portion of the array of light valve elements is seen. The individual light valves 52R, 52B and 52G are disposed in rows which are here shown as horizontal rows, but could be vertical. As seen in the enlarged view of FIG. 6, each light valve 52R of the red element row comprises a generally circular, substantially planar light reflective portion 54 which is supported by a centrally located support post member 56 which extends from the substrate 58. The support part 56 has a cross-section which is substantially less than the total area of the light reflective portion 54. The light reflective portion 54 is divided into two portions by slits 60, which extend inward from opposed edges of the light reflective portions 54. The slits 60 permit one half of portion 54 to bend in one direction and the other half to bend in the opposed direction.

The light reflective portions 54 bend or are deflected electrostatically due to the potential difference provided between portions 54 and conductive grid 62 provided on the substrate 58. The slit direction for the other primary color rows of light valves 52B and 52G are then respectively rotated 60° in turn with respect to the slits 60 of elements 52R and with respect to each other.

Figure 5:
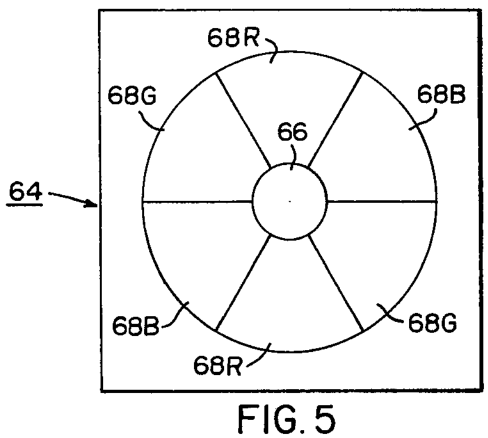
FIG. 5 is an enlarged representation of the schlieren optical means used in conjunction with the embodiment of FIG. 4; and, FIG. 6 is a view in cross-section of one of the light valves seen in FIG. 4.

The schlieren optical means 64 used with this embodiment is seen in FIG. 5 and comprises a central opaque stop portion 66. The primary color transmissive panels are provided for each primary color, with each panel occupying an arc of about 60°. The orientation of the red transmissive panels 68R match the deflection orientation of the corresponding elements 52R. Light reflected from deflected portions of element 52R will be primarily along an axis normal to the slit axis, and the red light transmissive panels 68R are also symmetrically spaced about this axis normal to the slit axis. The same relationships apply for the respective elements 52B and 52G with respect to the blue and green transmissive panels 68B and 68R of the schilieren optical means 64.

The color writing scheme for the system described above and shown in FIGS. 4 and 5 can be a line sequential system. The color information is written in lines according to the sequence of primary color rows. When the video signal is modulated by varying the potential of a barrier grid 50 which is closely spaced from the target and between the electron gun and the target, the signal current can be monitored as the electron beam hits the grid or ground plane electrode 62 as the beam moves from light valve to light valve in each row. In this way the beam position can be registered with the appropriate electronic control system, and it is thus possible to synchronize the beam scan with the video color information in the same way as done for a conventional color indexing cathode ray tube, the operation and circuitry of which are well known. The rows of light valves in the present embodiment are analogous to the phosphor strips of such indexing tubes.

In should be understood that the embodiment shown in FIGS. 4 and 5 can also be operated in a dot sequential fashion with the scanning being in a vertical direction from one primary color light valve to successive primary color light valves. An indexing signal can be generated by the beam traversing the space between rows. This indexing signal can be used to synchronize and trigger three consecutive video color signals in the appropriate sequence, i.e., red, blue, green.

Figure 7:
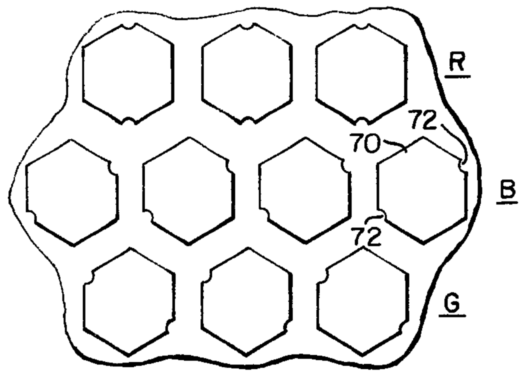
FIG. 7 is another embodiment of an array of hexagonal shape light valves.

The geometry and configuration of the light valves can be varied in another embodiment is shown in FIG. 7, in which the light reflective portions 70 are generally hexagonal and permit close spacing of the rows of primary color light valves. A pair of notches or slits 72 are provided in portion 70 to determine the bending axis for element 70. The same schlieren optical means as described with reference to FIG. 5 can be used with this system, and the same operating principles are discussed above.

The basic fabrication process set forth in above-identified U.S. Pat. No. 3,746,911 can be used in producing the light valve arrays of the present invention. The light valve array is formed by a photoresist exposture and etch process in which a semiconductive substrate is built upon. For the triad light valve elements 22 of FIG. 2, the slit 23 spacing is minimized and is of the order of 0.5 to 1 micron by using, for example, an electron beam exposure of the slit area of the photoresist, while using photo-exposure of the perimeter areas to provide spacing between triads of about 2 to 5 microns.

The overall diameter of the three light valves which make up the three valve groupings of FIG. 2 is of the order of about 0.002 inch. The generally planar wing portions are about 3000 Angstroms thick, with about a 300 Angstrom thick reflective metal layer deposited on the top surface exposed to the electron beam. The spacer post, typically of silicon when the planar wings are silicon dioxide, is about 4 micrometers in height.

We claim:

1. A video imaging system comprising:

a. a cathode ray tube including at least one electron gun;

b. an electrostatically deflectable light valve array target comprising a light transmissive substrate, a plurality of groupings of three spaced apart generally planar light reflective elements individually supported by a spacer-post member extending from the substrate, the spacer-post member being of substantially less cross-section than the light reflective element, and being located entirely beneath the light reflective element, and a light transmissive potential electrode disposed upon the substrate in the space between reflective elements, with respective reflective elements of each grouping of three being deflectable along three respective symmetrically offset primary color axes of deflection in response to a specific primary color video signal;

c. optical means and a light source for directing light onto the respective reflective elements and including selective transmissive portions of the optical means for passing light of a specific primary color from the deformed reflective element to permit focusing of a color image upon a screen, which selective transmissive portions are symmetrically spaced about the central optical axis of the optical means in correspondence to the respective primary color axes of deflection;

d. means for scanning the electron beam from the electron gun and for synchronizing and modulating a video signal to permit sequential activation of respective primary color designated reflective elements.

2. The system set forth in claim 1, wherein each grouping of three reflective elements comprise three approximately 120° triangular elements disposed about a common central apex, and the optical means selective transmissive portions comprise conversely disposed 120° transmissive portions about an opaque central stop.

3. The system set forth in claim 2, wherein the video signal is sequentially applied to the reflective elements.

4. The system set forth in claim 1, wherein the grouping of reflective elements comprise reflective elements which are deflectable about three specific axes each approximately 120° offset, which correspond to specific primary colors, with reflective elements which bend in the same direction being arranged in rows, and the optical means transmissive portions about a central stop being about the same three specific axes.

5. The system set forth in claim 4, wherein the video signal is sequentially applied to rows or columns of reflective elements.

6. The system set forth in claim 1, wherein the grouping of light reflective elements corresponding to three primary colors comprise three respective rows or columns of light reflective elements, with the rows or columns corresponding to a specific primary color being deflectable about a first axis, and the other two rows or columns of light valves being deflectable aobut axes which are respectively offset by about 60 degrees from the first axis and the other axis.

7. The system set forth in claim 6, wherein the optical means selective transmissive portions comprise pairs of triangular panels for each primary color disposed about an opaque central stop, with each pair of selective transmissive panels respectively disposed about the same axis about thich the light reflective elements are deflectable about.

8. An electrostatically deflectable light valve structure which is disposed upon a light transmissive substrate and is readily usable for color video imaging comprising:

three spaced apart symmetrical elements disposed about a central axis, each of said elements comprising a generally planar approximately 120° triangular electrostatically deflectable, light reflective portion disposed generally parallel to the substrate, a support and spacer-post extending from the underside of the deflectable planar portion to a light transmissive substrate, said support and spacer post is of substantially less cross-section than the deflectable planar portion, with the respective posts of the three elements proximate the central axis, with each of the deflectable planar portions being deflectable along three respective 120° offset primary color axes of deflection.

9. The device specified in claim 8, wherein an conductive grid is disposed upon the substrate proximate the perimeter portions of said planar portions whereby an electrostatic field provided between the grid and the planar portion produces deflection of the planar portion.

10. The device specified in claim 8, wherein a plurality of such three element devices are disposed as an array upon the substrate to form the imaging target of a display device.

11. The structure set forth in claim 8, wherein the light reflective planar portions comprise a deflectable support layer with a layer of light reflective material deposited thereon on the side opposite from the support and spacer post.

* * * * *